(12) United States Patent
Drumm

(10) Patent No.: US 8,702,181 B2
(45) Date of Patent: Apr. 22, 2014

(54) METHOD FOR OPERATING A BRAKE SYSTEM

(75) Inventor: Stefan A. Drumm, Saulheim (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 217 days.

(21) Appl. No.: 13/144,571

(22) PCT Filed: Jan. 7, 2010

(86) PCT No.: PCT/EP2010/050086
§ 371 (c)(1),
(2), (4) Date: Aug. 23, 2011

(87) PCT Pub. No.: WO2010/089162
PCT Pub. Date: Aug. 12, 2010

(65) Prior Publication Data
US 2011/0291469 A1    Dec. 1, 2011

(30) Foreign Application Priority Data

| Feb. 5, 2009 | (DE) | 10 2009 000 631 |
| Feb. 17, 2009 | (DE) | 10 2009 000 917 |
| Jun. 5, 2009 | (DE) | 10 2009 024 035 |

(51) Int. Cl.
*B60T 8/58* (2006.01)

(52) U.S. Cl.
USPC .............. 303/114.1; 303/2; 303/122.04

(58) Field of Classification Search
USPC ............. 303/2, 114.1, 115.4, 122.04, 122.05, 303/122.13, 122.14, 155
See application file for complete search history.

(56) References Cited

U.S. PATENT DOCUMENTS

| 4,812,777 A * | 3/1989 | Shirai | 303/14 |
| 5,979,999 A * | 11/1999 | Poertzgen et al. | 303/116.1 |
| 6,106,078 A * | 8/2000 | Johnston et al. | 303/2 |
| 6,318,817 B1 * | 11/2001 | Martin et al. | 303/116.1 |
| 2002/0140283 A1 * | 10/2002 | Kusano et al. | 303/114.1 |
| 2006/0186733 A1 * | 8/2006 | Drumm | 303/114.1 |
| 2008/0284242 A1 * | 11/2008 | Ganzel | 303/114.1 |

FOREIGN PATENT DOCUMENTS

| JP | 02193751 A | * | 7/1990 | B60T 8/58 |
| JP | 02220956 A | * | 9/1990 | B60T 8/58 |
| WO | WO 97/39931 | | 10/1997 | |
| WO | WO 97/41016 | | 11/1997 | |
| WO | WO 01/72567 | | 10/2001 | |
| WO | WO 2005/007476 | | 1/2005 | |

OTHER PUBLICATIONS

International Search Report—PCT/EP2010/050086—Mar. 29, 2010.

* cited by examiner

*Primary Examiner* — Bradley King
*Assistant Examiner* — Stephen Bowes
(74) *Attorney, Agent, or Firm* — Brinks Gilson & Lione

(57) ABSTRACT

Disclosed is a method for operating a brake system for motor vehicles that can be actuated in a "brake-by-wire" operating mode both by the vehicle driver and independently of the vehicle driver, and that is operated preferably in the "brake-by-wire" operating mode, and that can be operated in a first fallback operating mode wherein a brake force amplifier is available, and in a second operating mode without brake force amplification, in which only operation by the vehicle driver is possible. According to the invention, the "brake-by-wire" operating mode, provided as the normal operating mode, is divided into energy-saving and high-power operating modes, between which a switch is made depending on the braking situation, and using different components of the hydraulic circuit.

13 Claims, 11 Drawing Sheets

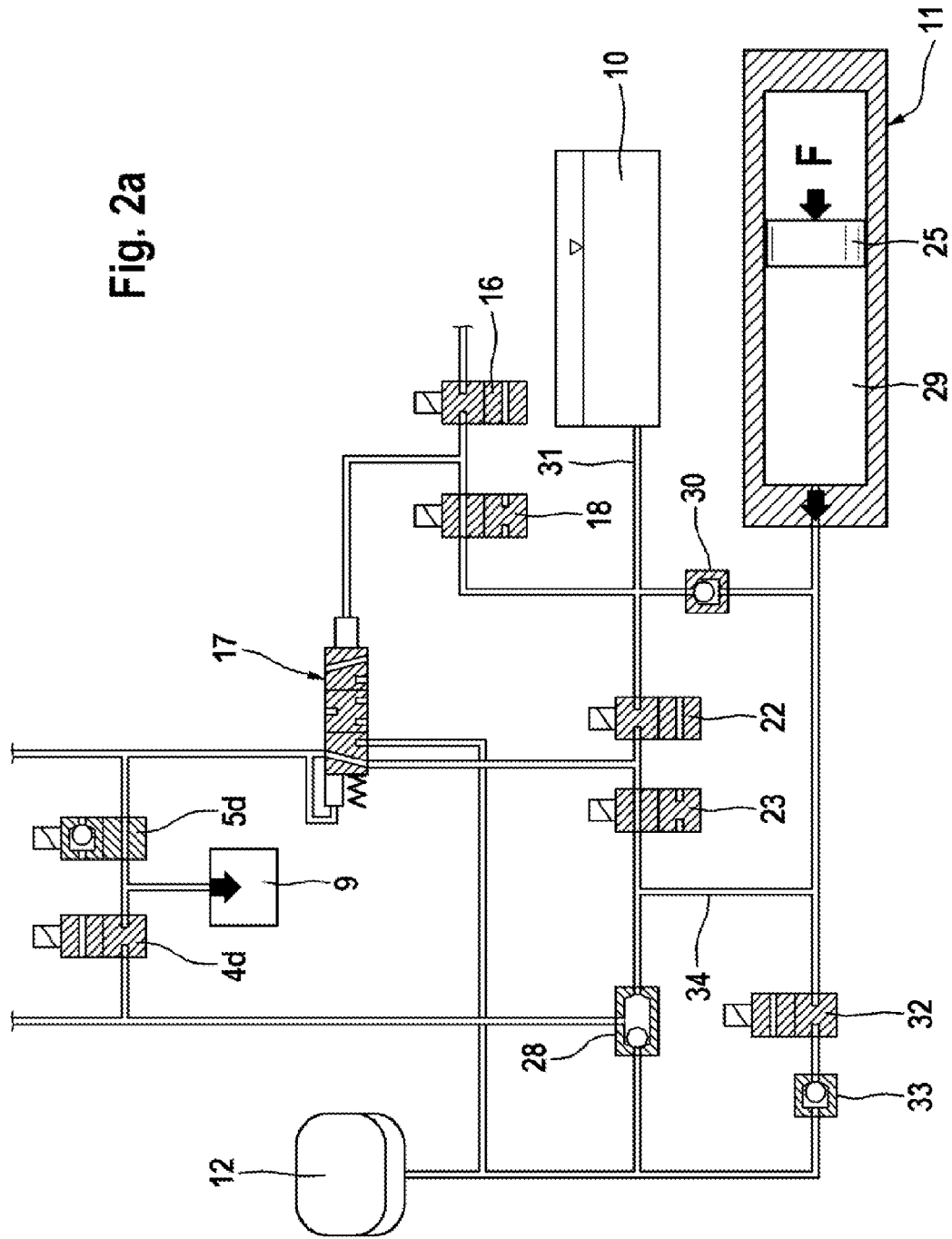

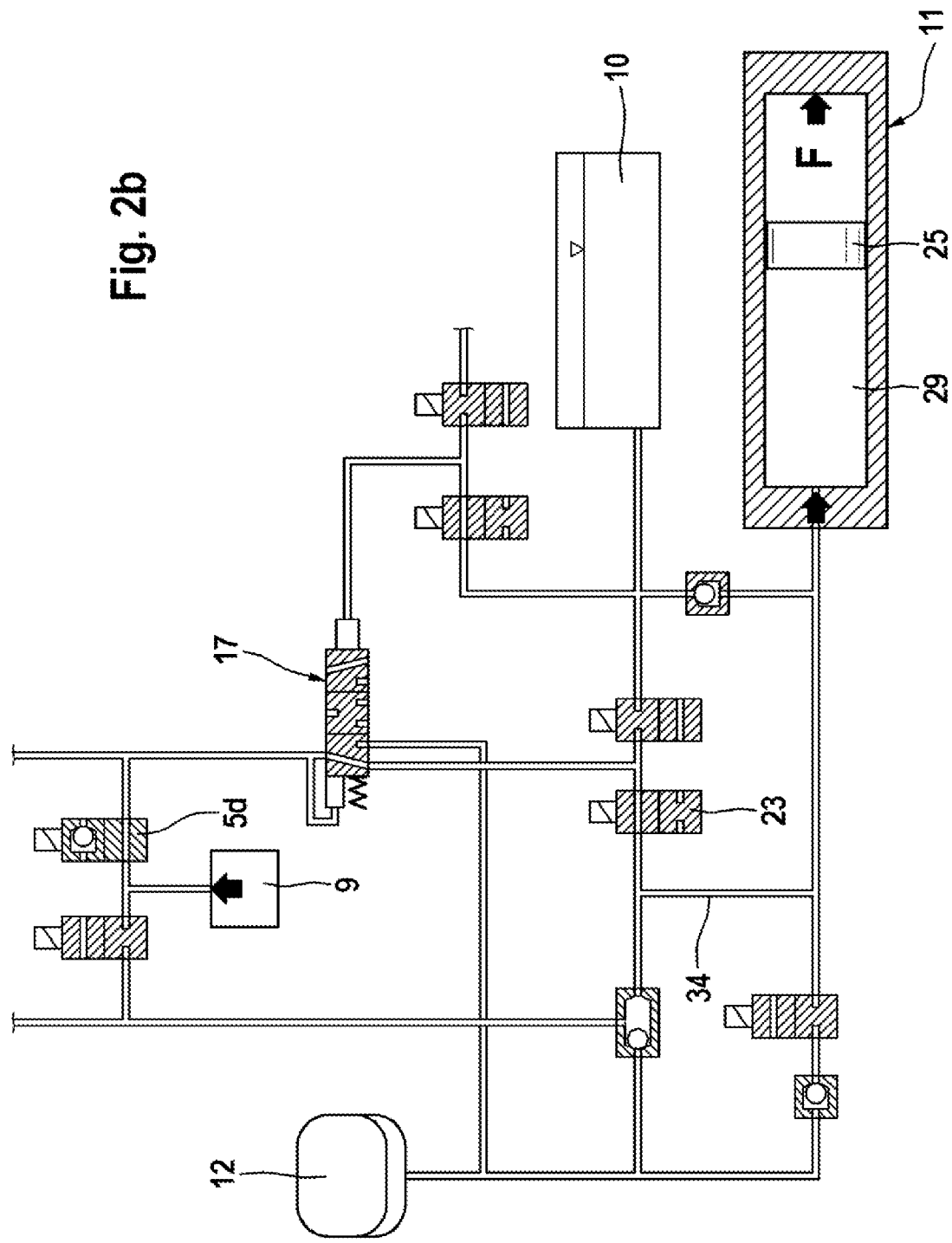

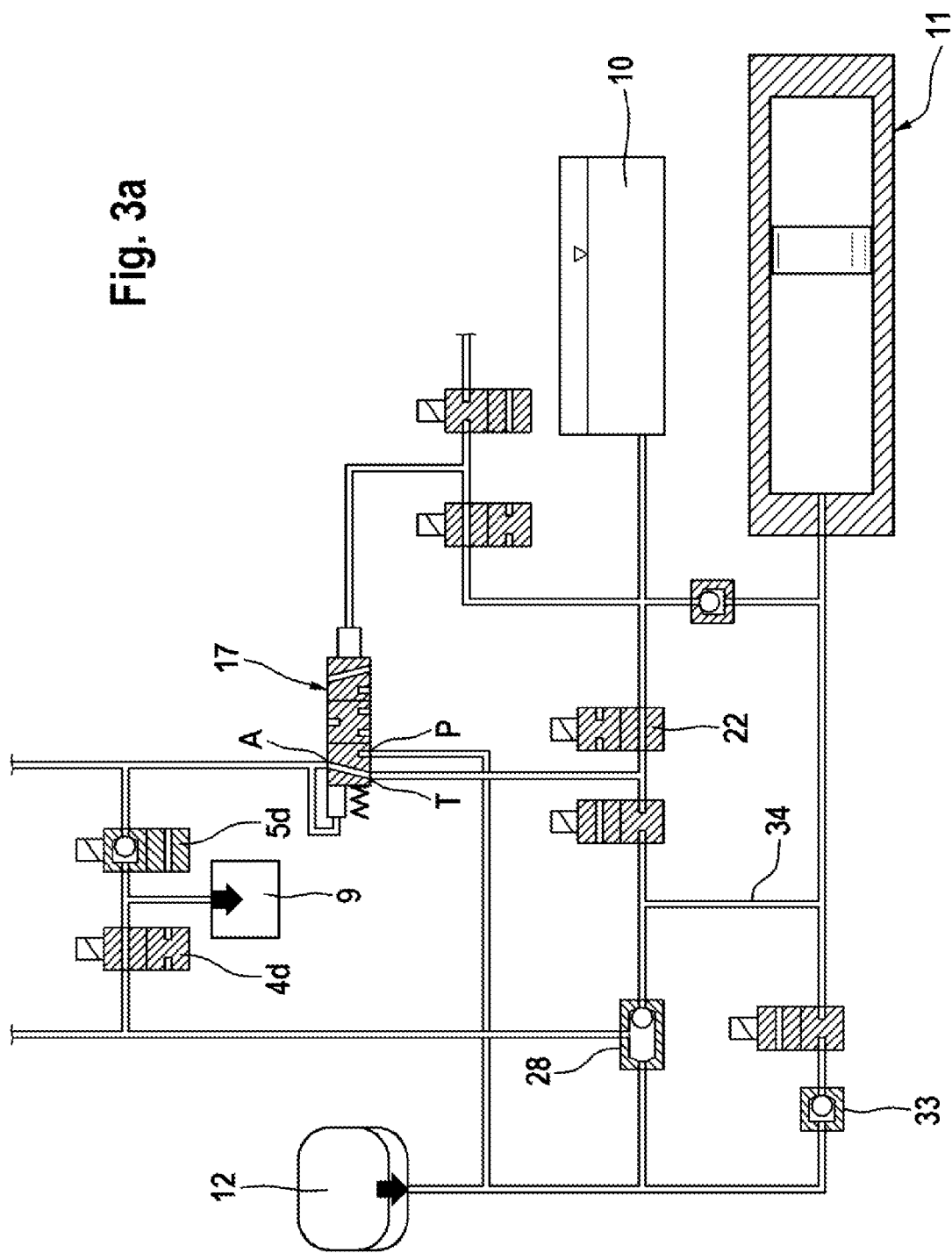

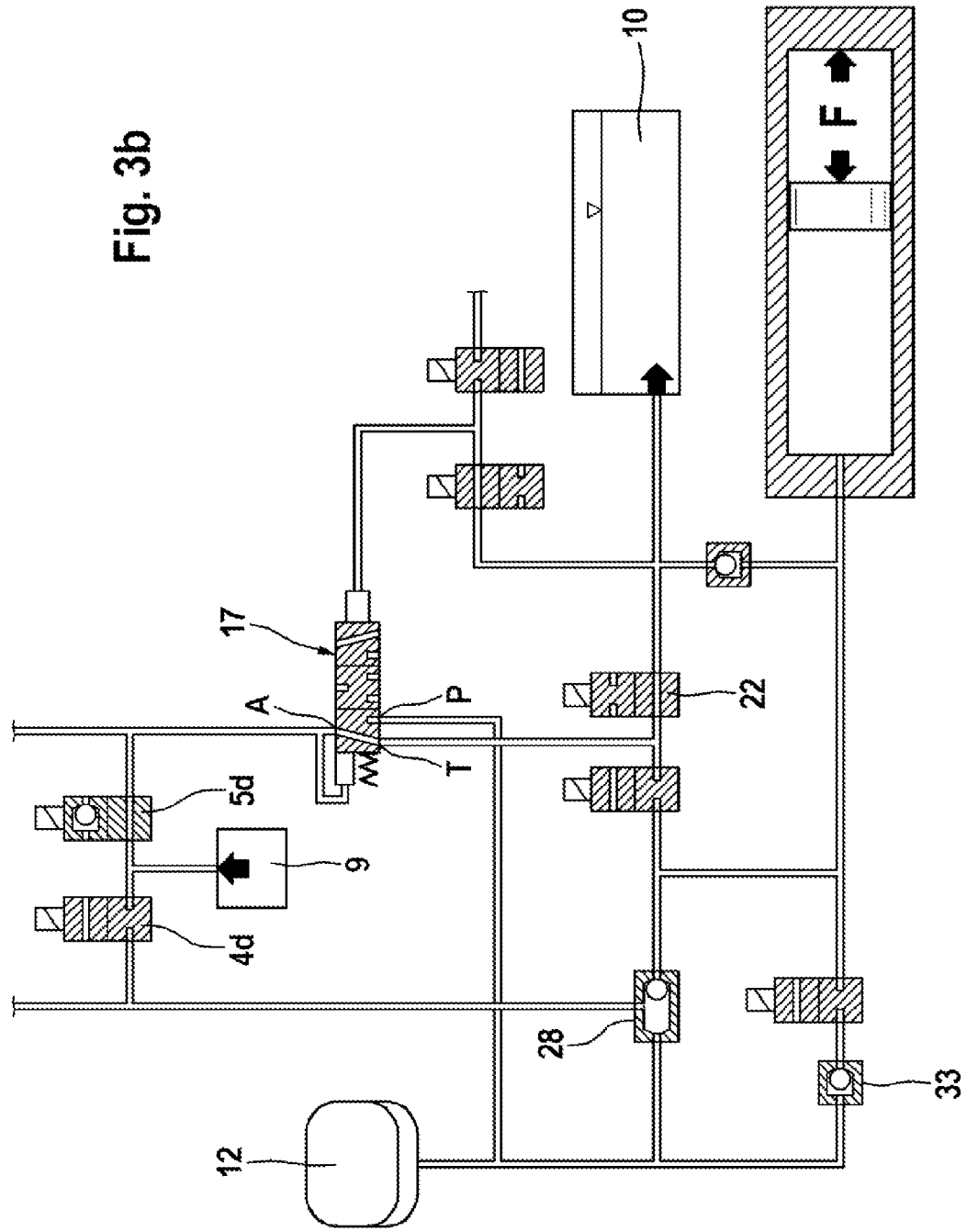

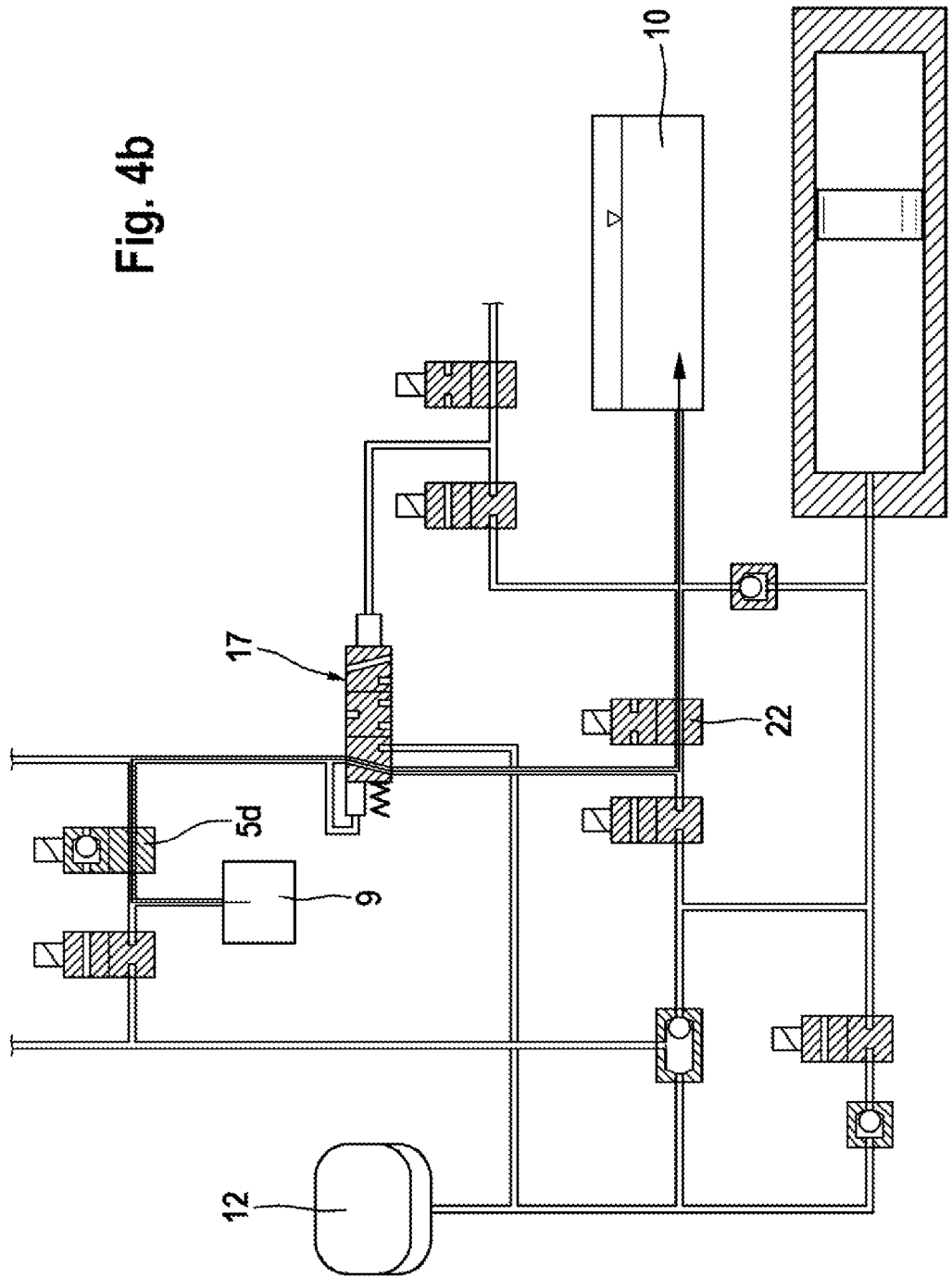

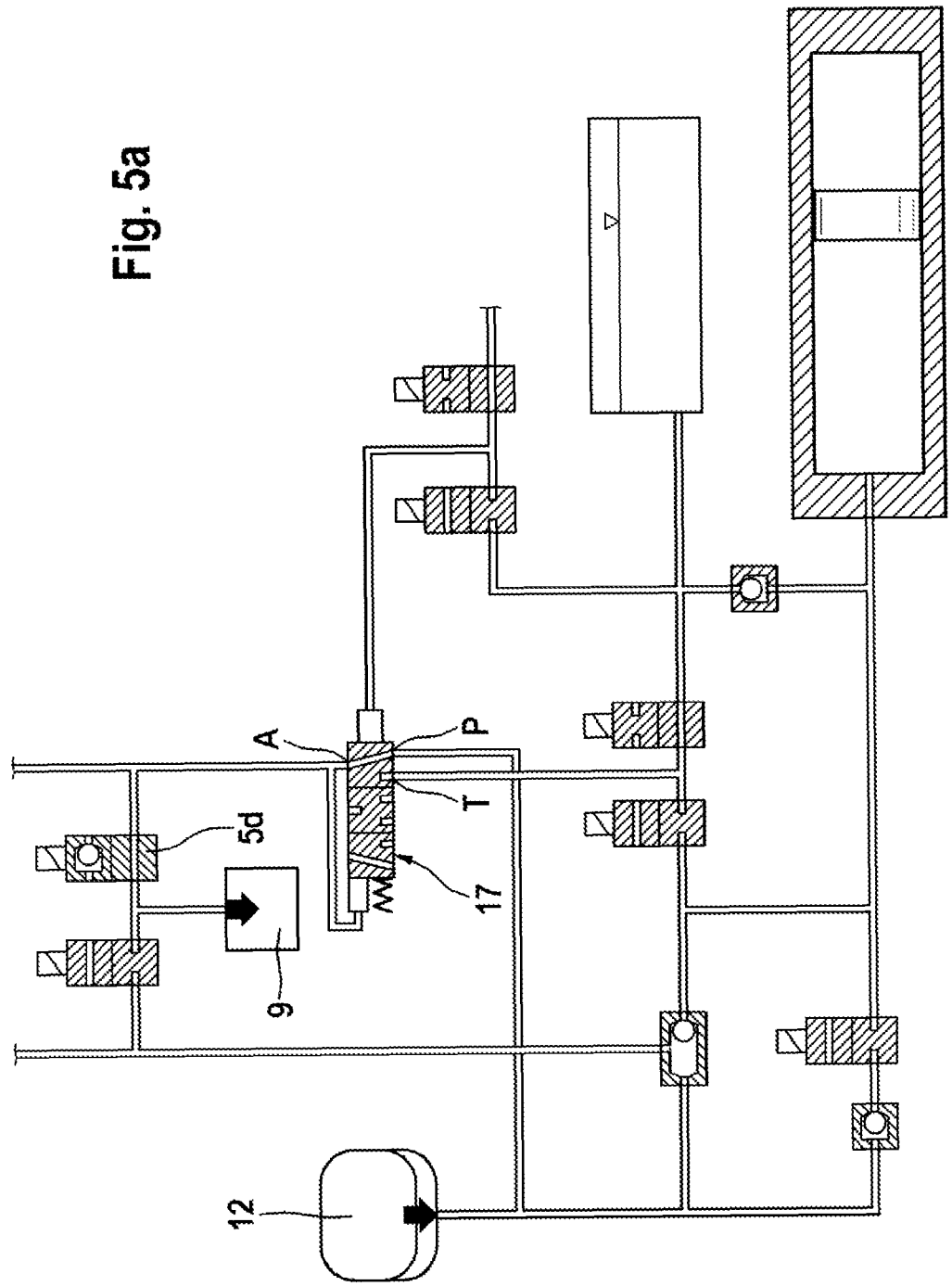

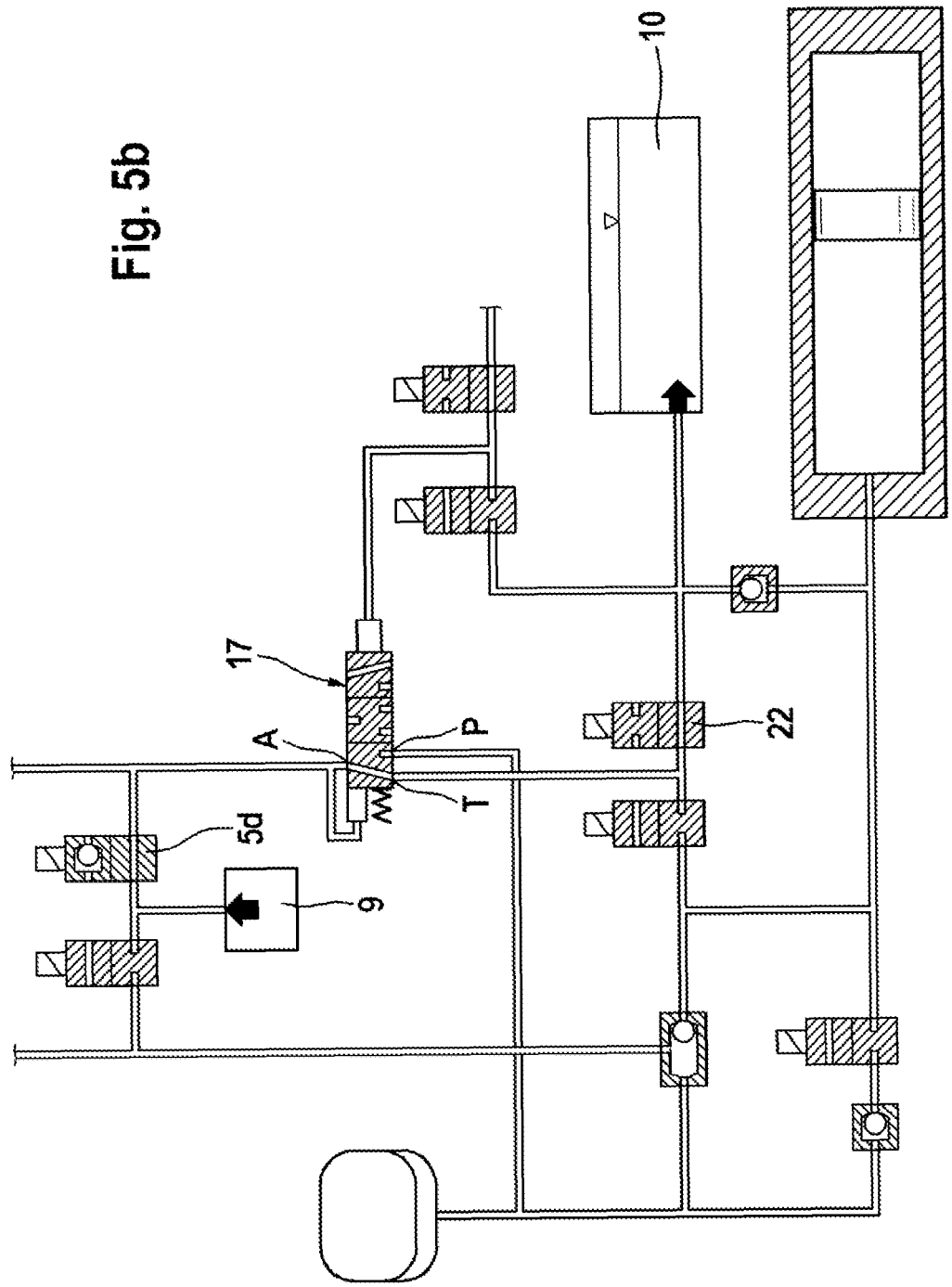

US 8,702,181 B2

METHOD FOR OPERATING A BRAKE SYSTEM

CROSS-REFERENCE TO RELATED APPLICATIONS

This application claims priority to German Patent Applications No. 102009000631.1, filed Feb. 5, 2009, 102009000917.5, filed Feb. 17, 2009, 102009024035.7, filed, Jun. 5, 2009, and International Patent Application No. PCT/EP2010/050086, filed Jan. 7, 2010.

TECHNICAL FIELD OF THE INVENTION

The present invention relates to a method for operating a brake system for motor vehicles.

BACKGROUND OF THE INVENTION

Such a brake system is disclosed, for example, by the international patent application WO 01/72567 A1. A perceived disadvantage of the known brake system is the energy efficiency of the known brake system, two aspects of which seem open to improvement.

In the preferred "brake-by-wire" operating mode, even slight braking, which does not involve great dynamics or require individual wheel brake pressure adjustment, is achieved by a hydraulic fluid volume drawn from the high-pressure accumulator. Thereafter the accumulator has to be recharged with an input of energy significantly greater than the hydraulic energy used. This applies to the majority of braking actions that occur in average driving. From the point of view of energy consumption it is therefore advisable to use hydraulic fluid from the hydraulic accumulator only when dynamic braking is required, and preferably to perform braking actions directly by means of the pressure of the electrically controllable pressure source.

In a fall-back operating mode, in which electrical control is unavailable but hydraulic power is available in the form of pressure and hydraulic fluid volume in the hydraulic accumulator, the known brake system (as in the "brake-by-wire" operating mode) functions as power brake system. It seems more sensible here not to dispense with the actuating energy contributed by the vehicle driver actuating the brake pedal, but to utilize this. It therefore makes more sense in this operating situation for the new brake system proposed here to function as power-assisted brake system.

The present invention creates the technical prerequisites for improving the energy efficiency on both counts.

SUMMARY OF THE INVENTION

The object of the present invention, therefore, is to create a method for operating the aforementioned brake system, which will allow a considerable increase in the energy efficiency.

According to the invention this object is achieved by dividing the "brake-by-wire" operating mode intended as normal operating mode into energy-saving and high-power operating modes, between which switching occurs as a function of the braking situation and which utilize different components of the hydraulic circuit.

BRIEF DESCRIPTION OF THE DRAWINGS

In the following description the present invention will be explained on the basis of an exemplary embodiment and with reference to the schematic drawing attached, in which:

FIGS. 2a, 2b show a partial representation of the brake system, relevant to the invention, in order to explain the processes required for normal braking, FIGS. 3a, 3b show a partial representation of the brake system, relevant to the invention, in order to explain the processes required for another operating mode, FIGS. 4a, 4b show a partial representation of the brake system, relevant to the invention, in order to explain the processes required for so-called extreme braking, FIGS. 5a, 5b show a partial representation of the brake system, relevant to the invention, in order to explain the processes required for a further operating mode.

DETAILED DESCRIPTION OF THE DRAWINGS

Figure 1:
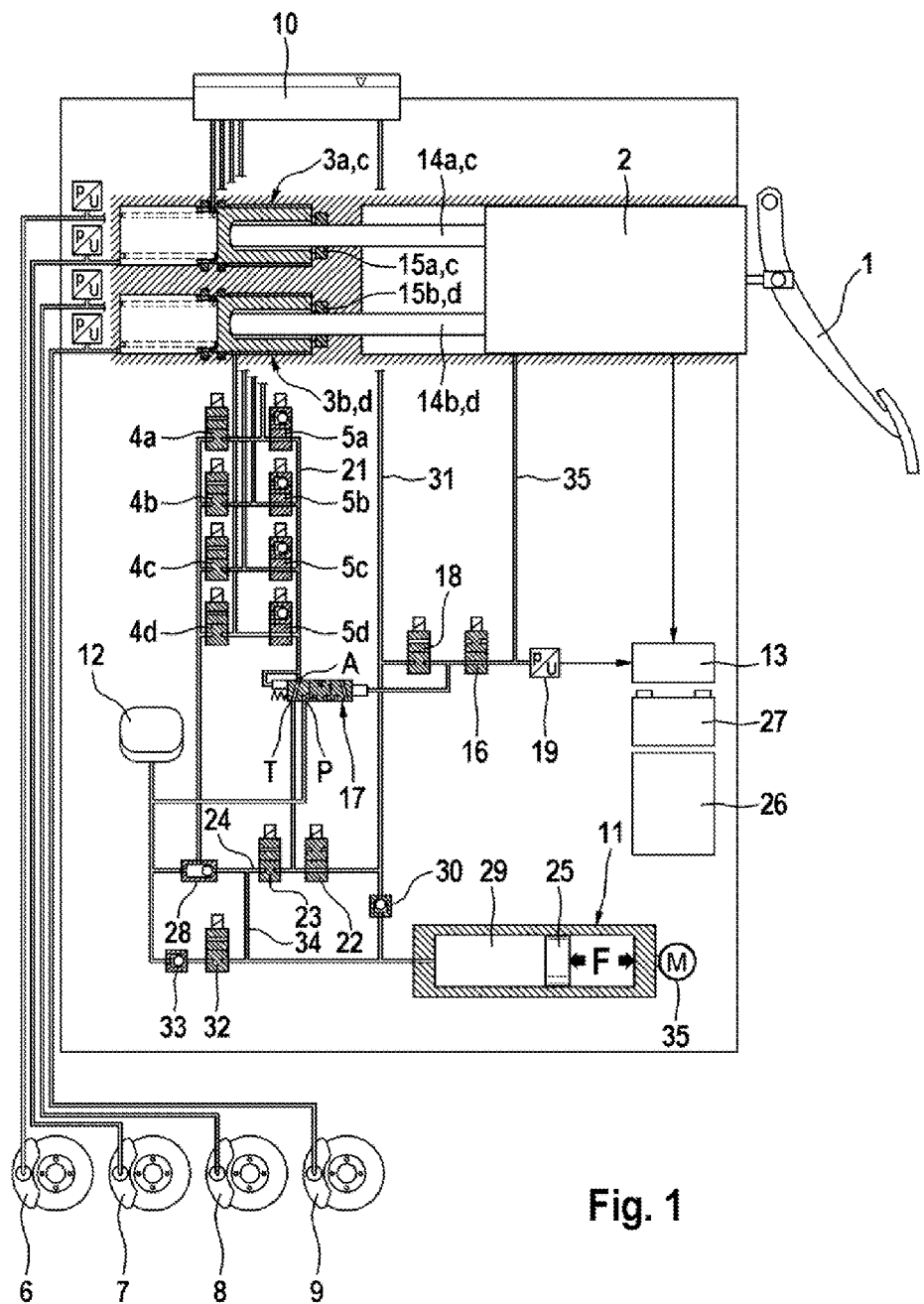
FIG. 1 shows a hydraulic circuit diagram of a brake system according to the invention.

The brake system represented schematically in FIG. 1 substantially comprises an actuating unit 2, which can be actuated by means of a brake pedal 1 and which is embodied, for example, as a single-circuit brake master cylinder. The brake system according to the invention further comprises piston-cylinder arrangements and separating piston devices 3a-d, which are operatively connected to the output side of the actuating unit 2 and to which electrically controllable pressure-regulating valves 4a-d, 5a-d are connected on the input side, and to which vehicle brakes 6-9 are connected, a hydraulic fluid reservoir 10, a hydraulic pressure source 11, a high-pressure accumulator 12, and an electronic control unit 13. Here a separating piston device 3a-d is preferably assigned to each wheel brake 6-9. Force is transmitted between the actuating unit 2 and the separating piston devices 3a-d by means of mechanical control elements 14a-d, which are embodied as force-transmitting rods and which are supported, where necessary by way of damping elements, on a piston (not shown) of the actuating unit 2. Seals bearing the reference numerals 15a-d are provided for the external sealing of the control elements 14a-d. A power supply unit (for example an electrical power supply with voltage transformer) 26, indicated only schematically, which may interact with an electrical storage device (electrical storage battery) 27, is provided for supplying the brake system according to the invention with electrical power.

As can further be seen from FIG. 1, the actuating unit 2 comprises a hydraulic control chamber (not shown), which is connected by way of a normally open (NO) 2/2-way directional control valve 16 to a hydraulic control connection of a pressure-regulating valve arrangement 17, which will be explained in more detail below. Said control connection can be connected by way of a normally closed (NC) 2/2-way directional control valve 18 to the hydraulic fluid reservoir 10. The inlet pressure in the control chamber is registered by means of a pressure sensor 19.

As has already been mentioned, a pressure-regulating valve assembly, which is either constructed as shown from two analog-controllable 2/2-way directional control valves 4, 5, or is alternatively embodied as a 3/3-way directional control valve, is assigned to each wheel brake. The decisive factor is that the pressure-regulating assembly 4a, 5a, 4b, 5b, 4c, 5c, 4d, 5d for each individual wheel has three hydraulic connections, that is to say a normally closed "high-pressure connection", an outlet connection and a "low-pressure connection".

The high-pressure connections are all connected to the outlet connection of a shuttle valve 28, which is connected between the high-pressure accumulator 12 and the electrically controllable pressure source 11. The output connections are individually connected to the separating piston devices 3*a-d* and the low-pressure connections are all connected to one line portion 21, to which a brake system pressure can be admitted and which in the resting state of the brake system shown is connected via the pressure-regulating valve arrangement 17 and a normally open valve 22 to the hydraulic fluid reservoir 10 at zero pressure.

A valve assembly connected to the inlet connection of said shuttle valve 28 remote from the high-pressure accumulator 12 is formed by a normally open (NO) 2/2-way directional control valve 22 and a normally closed (NC) 2/2-way directional control valve 23. Here the valve assembly comprises three hydraulic connections: a low-pressure connection connected to the hydraulic fluid reservoir 10, a working connection connected to a low-pressure connection of the pressure-regulating valve arrangement 17, and a high-pressure connection, which is connected to a hydraulic line portion 34, via which a hydraulic pressure can be fed in, as will be explained in more detail later. As an alternative to the valve assembly formed by the NO-NC 2/2-way pair of valves 22, 23 having three connections, a single 3/3-way directional control valve may be used.

Figure 7:
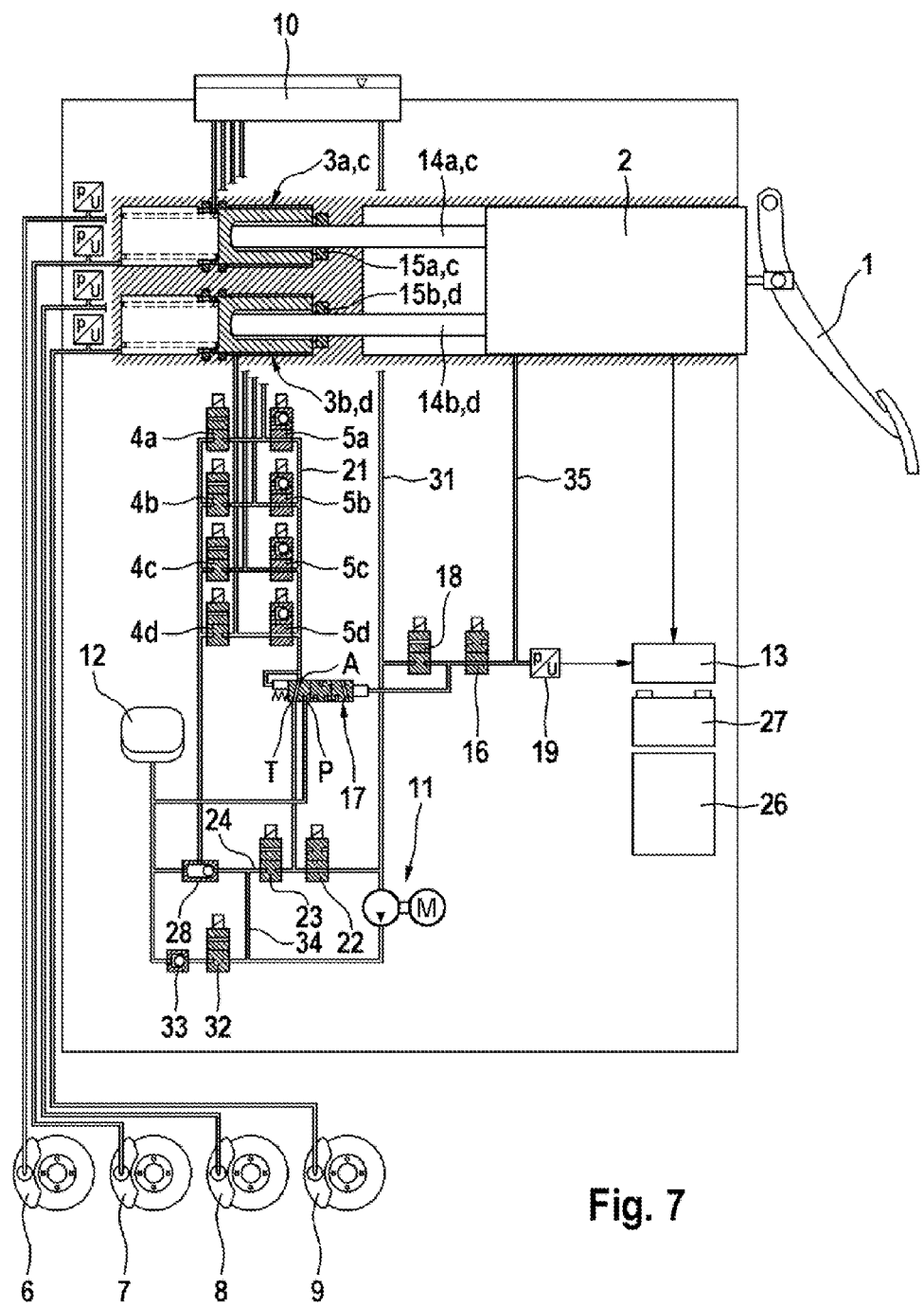
FIG. 7 shows a hydraulic circuit diagram of a brake system according to a further embodiment of the invention.

It can furthermore be seen from the drawing that the aforementioned pressure source 11 is embodied as an electro-hydraulic actuator, the piston 25 of which can be actuated by means of an electric motor 35 by way of a rotational-translational transmission. A pressure chamber 29 of the electro-hydraulic actuator 11 defined by the piston 25 is connected on the one hand to the hydraulic fluid reservoir 10, by way of an intake non-return valve 30 and a hydraulic connecting line 31, and on the other to the high-pressure accumulator 12, by way of a solenoid-actuated separating valve 32 and a discharge non-return valve 33, so that the high-pressure accumulator 12 can be charged by the pressure source 14. As an alternative to the use of an electro-hydraulic actuator, in another development of the invention according to FIG. 7, the pressure source 11 may conceivably be embodied as an electric motor-driven pump, which is inserted into the hydraulic circuit instead of the non-return valve 30. In this case the suction side of the pump would be connected by way of the hydraulic connecting line 31 to the hydraulic fluid reservoir 10, and the pressure side of the pump would be connected by way of the separating valve 32 and the non-return valve 33 to the high-pressure accumulator 12. The non-return valve 33 already mentioned prevents draining of the high-pressure accumulator 12 in the event of a reduction in the pressure of the pressure source 14. This allows the pressure in the hydraulic connecting line 34 to be set by means of the electronically controllable pressure source 14 to a value below the pressure level of the high-pressure accumulator 12, the connecting line 34 connecting the electro-hydraulic actuator 11 to the inlet connection of the aforementioned 2/2-way directional control valve 23.

As the person skilled in the art can also infer from the drawing, the pressure-regulating valve arrangement 17, referred to several times previously, is embodied as a 3/3-way directional control valve, which as a pressure-maintaining valve operating in opposing directions can be controlled, on the one hand by the inlet pressure set in the actuating unit 2 by the driver and on the other by the brake system pressure prevailing in the line 21, via two hydraulic control connections arranged on the left-hand and right-hand side of the drawing. Both spool valve and seat valve engineering or a combination of these variants may be used to provide the pressure-regulating valve arrangement 17 represented as a 3/3-way directional control valve in the drawing. It should be expressly pointed out at this point that as the hydraulic passages and shut-offs change, continuous transitional states occur between the switching positions of the pressure-regulating valve arrangement 17 represented in the figures, which can be stabilized given a correspond control by the control engineering. The 3/3-way directional control valve is accordingly embodied as an analog valve and not as a switching valve with unstable transitional states. If in the following text reference is nevertheless made to switching positions, this in each case is intended to signify a control or actuating state of the pressure-regulating valve arrangement 17, which although continuously variable approximates or is assignable to one of the valve positions represented in the figures. Besides the control connections already mentioned, the 3/3-way directional control valve comprises a high-pressure connection P, a low-pressure connection T and a working connection A. In the first switching position represented in the drawing its working connection (A) is connected via its low-pressure connection (T) to the middle tap of both 2/2-way directional control valves 22, 23, whilst its high-pressure connection (P), which is connected directly to the high-pressure accumulator 12, remains closed.

In the second switching position of the 3/3-way directional control valve 17 all three connections (P, T, A) remain closed, whilst in the third switching position the working connection (A) is connected to the high-pressure connection (P). The aforementioned components 11, 12, 17, 25, 26, 29-34 form a hydraulic circuit for the electronically controlled provision of individual wheel brake pressures, in particular as a reaction to a brake force introduced into the system via the brake pedal 1 in the "brake-by-wire" mode as normal operating mode. In addition, in the absence of electronic control, brake pressures boosted via the aforementioned pressure-regulating valve arrangement 17 are provided purely hydraulically, whilst only unboosted wheel brake pressures are available when the high-pressure accumulator 12 is exhausted.

As already mentioned above, FIG. 2*a* shows a pressure build-up which in the brake system according to the invention is needed in normal braking. Although only of the wheel brakes 6-9, i.e. wheel brake 9, is shown for the purposes of explanation, all wheel brakes 6-9 receive the same pressure. Pressure is built up, controlled exclusively by the electrically controllable pressure source 11, in the actuating direction of the piston 25, which is denoted by the directional arrow F. In this case the normally closed 2/2-way directional control valve 23 mentioned in connection with FIG. 1 is switched over in such a way that the volume of hydraulic fluid displaced from the pressure chamber 29 of the pressure source 11 passes to the pressure-regulating valve arrangement 17 and thence in its switching position shown to the third connections of the pressure-regulating valve devices 4, 5. The pressure is built up in the wheel brakes 6-9 or the wheel brake 9 shown by a flow through the associated normally open pressure-regulating valve 5*d*. In the process only the necessary pressure is built up, so that energy is saved, compared to braking in which the high-pressure accumulator 12 is brought into play. In the operating mode described the high-pressure accumulator 12 is hydraulically isolated from the electrically controllable pressure source 11 by the separating valve 32.

A reduction of pressure in normal braking is represented in FIG. 2*b*. In this case all valves mentioned in connection with FIG. 2*a* remain in the switching positions shown there, whilst the piston 25 of the electrically controllable pressure source 11 is returned so as to enlarge the pressure chamber 29 (see directional arrow F). The hydraulic fluid flows from the wheel brakes 9 via the open valves 5d, 17 and 23 into the line 34 and thence into the pressure chamber 29.

The further operating mode shown in FIG. 3a, b comes into play if the pressure provided by the high-pressure accumulator 12 is greater than the pressure prevailing in the line 34, which can be applied by the electrically controllable pressure source 11. The build-up of pressure shown in FIG. 3a takes place if
wheel-individual pressures are needed,
a heavy load on the vehicle electrical system is to be avoided,
an especially high pressure build-up dynamic is required, or
braking has to be performed during the process of charging the high-pressure accumulator 12.

Here the pressure supplied by the high-pressure accumulator 12 is admitted by the shuttle valve 28 to the second connections of the pressure-regulating valve devices 4, 5, pressure-regulating valves 4 being switched into a switching position that allows the pressure of the high-pressure accumulator to act upon the associated wheel brakes 9.

In the event of a pressure reduction, the pressure-regulating valve device 4d, 5d is switched so that the wheel brake 9 is isolated from the second connection of the pressure-regulating valve device 4d, 5d and the outlet connection of the shuttle valve 28, and is connected to the working connection A of the pressure-regulating valve arrangement 17. Through the connection, open when the pressure-regulating valve arrangement 17 is in the rest position shown, between its working connection A and its low-pressure connection T, and the normally open (NO) 2/2-way directional control valve 22, the third connection of the pressure-regulating valve device 4d, 5d is connected to the hydraulic fluid reservoir 10 at zero pressure, so that a reduction of the inlet pressure in the wheel brake 9 occurs.

Figure 4A:
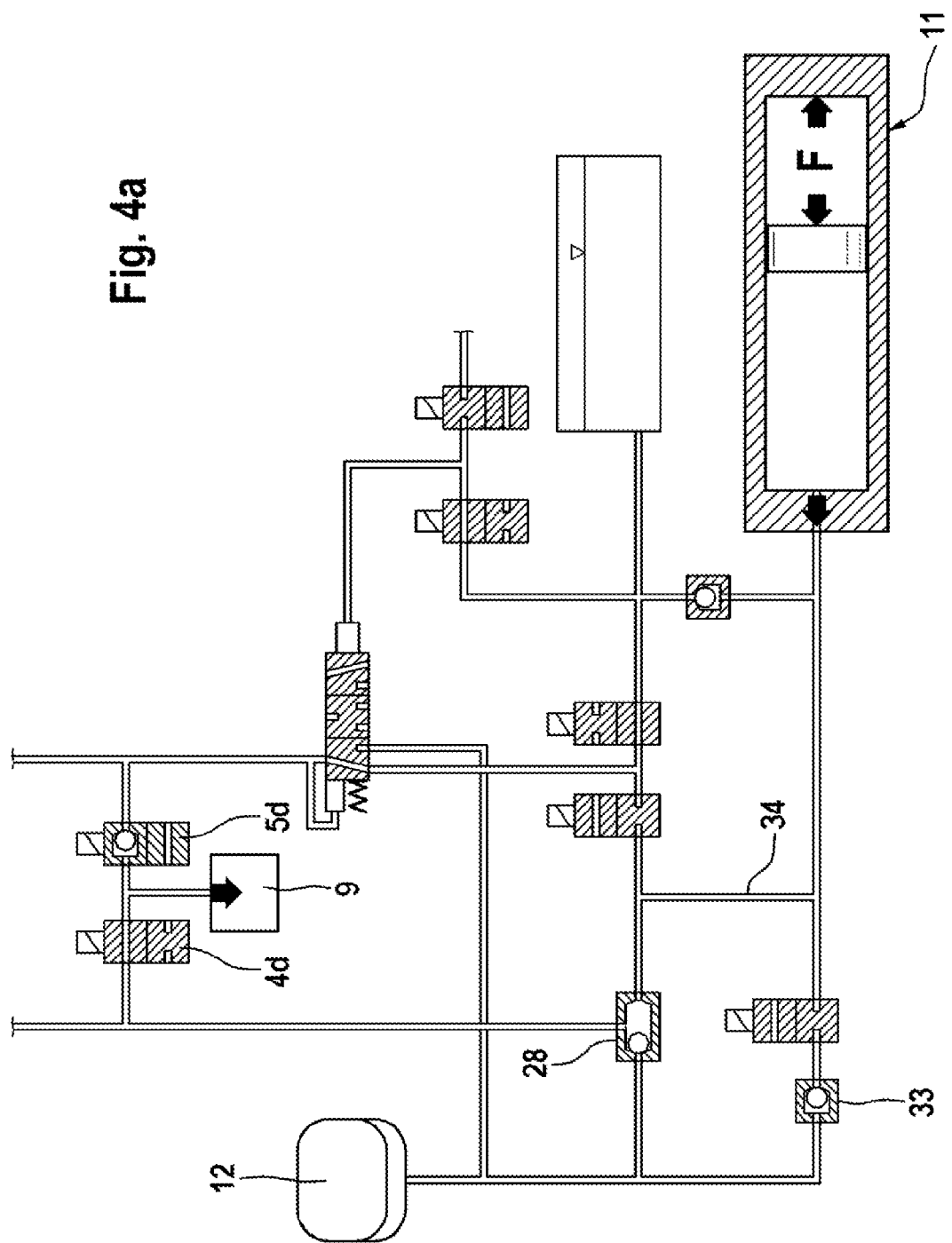

FIGS. 4a, b show the working of the brake system according to the invention in a further operating mode, in which a brake pressure is required, which exceeds the instantaneous value of the pressure provided by the high-pressure accumulator 12, and which is referred to as extreme braking. The build-up of pressure shown in FIG. 4a takes place if
full braking is necessary despite poor brake linings (fading),
a locking of individual wheels is advisable in order to prevent the vehicle overturning.

In this case the braking can be performed both on selected wheels and in wheel brake groups. Here the pressure supplied by the electrically controllable pressure source 11 is admitted by the shuttle valve 28 to the second connections of the pressure-regulating valve devices 4, 5, the pressure-regulating valves 4 being switched into a switching position which allows said pressure to act upon the associated wheel brakes 9.

Pressure is reduced in the manner described in connection with FIG. 3d, so that no description is necessary here.

FIGS. 5a, 5b show braking processes which are performed in the event of a failure of the electrical power supply 26, 27 or the electronic control unit 13. An important prerequisite for this operating mode, in which no actuation of the solenoid-controlled valves is possible, is a charged high-pressure accumulator 12. In the event of a build-up of pressure, in which the same pressure acts on all wheel brakes 6-9, the pressure-regulating valve arrangement 17 is brought by driver actuation into the switching position shown in FIG. 5a, in which its high-pressure connection P is connected to the working connection A, so that the pressure provided by the high-pressure accumulator 12 can act on the wheel brakes 9 via the third connection of the normally open 2/2-way directional control valve 5d. The pressures on the third connections of the pressure-regulating valve devices 4, 5 are regulated, controlled by the brake pedal, the pressure-regulating valve arrangement 17 being supplied with hydraulic power from the high-pressure accumulator 12.

The inlet pressure into the wheel brake 6-9 is first reduced by the pressure-regulating valve arrangement 17 switching to the rest position shown in FIG. 5b, in which its working connection A is connected to the low-pressure connection T. In this case the wheel brakes 6-9 are connected via the third connections of the pressure-regulating valve devices 4, 5 and the normally open (NO) 2/2-way directional control valve 22 to the hydraulic fluid reservoir 10 at zero pressure, so that pressure is reduced as in the operating modes explained in connection with FIGS. 3, 4.

Figure 6:
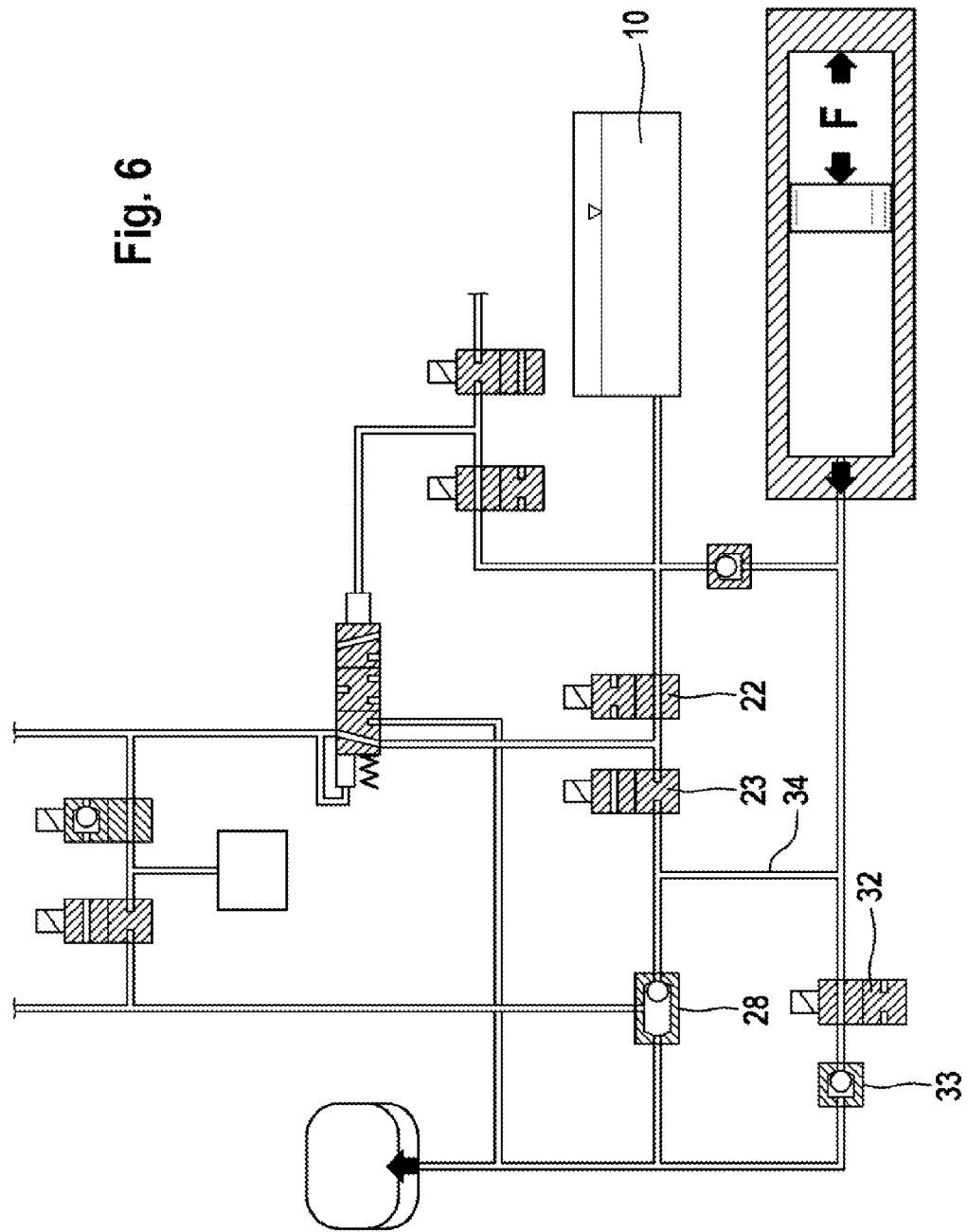
FIG. 6 shows a partial representation of the brake system, relevant to the invention, in order to explain the processes required for charging the high-pressure accumulator.

Finally, FIG. 6 shows a charging process of the high-pressure accumulator 12, which is connected to the high-pressure connection P, closed in the rest position shown, of the pressure-regulating valve arrangement 17. For this purpose the separating valve 32 is switched into the open position, so that the hydraulic fluid displaced from the electrically controllable pressure source 11 can flow into the high-pressure accumulator 12 via the discharge non-return valve 33.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method of controlling a brake system comprising the following steps:
providing at least two piston-cylinder arrangements (3a-d) for generating brake pressures in wheel brakes (6-9) of the vehicle,
providing an actuating unit (2) operatively connected to the piston-cylinder arrangements (3a-d) for mechanically actuating the piston-cylinder arrangements in a first fall-back operating mode and in a second fall-back operating mode,
providing a brake pedal (1) connected to the actuating unit (2) for control of the brake system by the vehicle driver,
providing a hydraulic circuit operatively connected to the piston-cylinder arrangements (3a-d) on an inlet side and having an electrically controllable, hydraulic pressure source (11), a high-pressure accumulator (12) that can be charged by the pressure source (11) for maintaining a hydraulic servo power for performing a first brake boosting function, and electrically actuated pressure-regulating valve devices (4, 5), each electrically actuated pressure-regulating valve device having a first connection forming an outlet connection for a hydraulic control of the piston-cylinder arrangements (3a-d), a second connection, which is connectable to the first connection by actuating the pressure-regulating valve devices, and a third connection, which in an unactuated state of the pressure-regulating valve devices (4, 5) is connected to the first connection and which can be shut off in a through-flow direction by an electrical actuation, providing a pressure-regulating valve arrangement (17) which is configured to be actuated by the brake pedal (1) and which in the first fall-back operating mode provides a brake system pressure, proportionable via the brake pedal (1);

providing a driver intention registering device (19);

providing a hydraulic fluid reservoir (10), which is connectable to the actuating unit (2) and to the piston-cylinder arrangements (3a-d);

providing an electrical power supply (26, 27);

providing an electronic control unit (13);

providing the first brake boosting function to boost a brake pressure generated by a vehicle driver in the first fall-back operating mode and not in the second fall-back operating mode, the brake system being configured to operate in a default brake-by-wire mode, the brake-by-wire mode including at least a first high-power operating mode operating with the first brake boosting function and a normal operating mode being a low-power operating mode without operating the first brake boosting function; and switching between the first high-power operating mode and the low-power operating mode as a function of a braking situation;

determining that a brake operation requires braking, for which the low-power operating mode is sufficient;

selecting the low-power operating mode;

delivering pressure provided by the electrically controllable pressure source (11) to the third connections according to a second brake boosting function, and leaving the pressure held by the high-pressure accumulator (12) unused by keeping the high-pressure accumulator disconnected from the third connections.

2. The method as claimed in claim 1, further comprising the step of controlling a necessary build-up and reduction of pressure by way of a hydraulic connection between the electrically controllable pressure source (11) and the piston-cylinder arrangements (3a-d) through the third connections of the pressure-regulating valve devices (4, 5), via the pressure-regulating valve arrangement (17).

3. The method as claimed in claim 1, further comprising the steps of:

determining that a brake operation requires selective braking of individual wheels;

selecting the first high-power operating mode;

building up wheel brake pressures through individually opening the second connections of the pressure-regulating valve devices (4, 5), and performing pressure reduction sequences via the third connections of the pressure-regulating valve devices (4, 5).

4. The method as claimed in claim 3, further comprising the steps of determining an individual brake pressure set-point value for each wheel brake, and reducing a pressure present at the third connections of the pressure-regulating valve devices (4, 5) to a value less than or equal to the lowest brake pressure set-point value.

5. The method as claimed in claim 4, wherein the pressure present at the third connections of the pressure-regulating valve devices (4, 5) is reduced by connecting the third connections to the hydraulic fluid reservoir (10).

6. The method as claimed in claim 1, further comprising the steps of determining that a braking operation requires a brake pressure exceeding an instantaneous value of the pressure provided by the high-pressure accumulator (12), initiating a second high-power operating mode by establishing a hydraulic communication between the second connection of the pressure-regulating valve devices (4, 5) and the electrically controllable pressure source (11) according to the second brake boosting function, and hydraulically isolating the high-pressure accumulator (12) from the communication.

7. The method as claimed in claim 6, further comprising the steps of:

determining that an increase of the pressure of the electrically controllable pressure source (11) is in excess of the instantaneous pressure value in the high-pressure accumulator (12), switching a shuttle valve (28) with an outlet connection connected to the second connections of the pressure-regulating valve devices (4, 5).

8. The method as claimed in claim 1, wherein the pressure-regulating valve arrangement (17) is hydraulically controllable, the method further comprising the steps of operating an electrically controllable deactivation device (16, 18) disabling a hydraulic control of the pressure-regulating valve arrangement (17), and maintaining an electric control of the electrically controllable pressure source (11) and the pressure-regulating valve devices (4, 5).

9. The method as claimed in claim 8, wherein during a failure of the electrical power supply (26, 27) or of the electronic control unit (13) the pressure-regulating valve arrangement (17), controlled by the brake pedal, regulates the pressures at the third connections of the pressure-regulating valve devices (4, 5) and is supplied with hydraulic power from the high-pressure accumulator (12).

10. The method as claimed in claim 1, wherein the hydraulic pressure source (11) is an electro-hydraulic actuator, the method further comprising the step of controlling the pressure provided by the electro-hydraulic actuator (11) by an electronic drive control of the electro-hydraulic actuator.

11. The method as claimed in claim 1, wherein the hydraulic pressure source (11) is a pump, the method further comprising the step of controlling the pressure provided by the pump (11) by a coordinated electronic control of a drive of the pump and of a valve.

12. The method as claimed in claim 1, wherein in the first high-power operating mode, pressure provided by the high-pressure accumulator (12) is delivered to the second connections of the pressure-regulating valve devices (4, 5).

13. A method of controlling a brake system comprising the following steps:

providing at least two piston-cylinder arrangements (3a-d) for generating brake pressures in wheel brakes (6-9) of the vehicle, providing an actuating unit (2) operatively connected to the piston-cylinder arrangements (3a-d) for mechanically actuating the piston-cylinder arrangements in a first fall-back operating mode and in a second fall-back operating mode, providing a brake pedal (1) connected to the actuating unit (2) for control of the brake system by the vehicle driver, providing a hydraulic circuit operatively connected to the piston-cylinder arrangements (3a-d) on an inlet side and having an electrically controllable, hydraulic pressure source (11), a high-pressure accumulator (12) that can be charged by the pressure source (11) for maintaining a hydraulic servo power for performing a first brake boosting function, and electrically actuated pressure-regulating valve devices (4, 5), each electrically actuated pressure-regulating valve device having a first connection forming an outlet connection for a hydraulic control of the piston-cylinder arrangements (3*a-d*), a second connection, which is connectable to the first connection by actuating the pressure-regulating valve devices, and a third connection, which in an unactuated state of the pressure-regulating valve devices (4, 5) is connected to the first connection and which can be shut off in a through-flow direction by an electrical actuation, providing a solenoid-actuated separating valve (32) hydraulically isolating the high-pressure accumulator (12) from the electrically controllable pressure source (11), providing a pressure-regulating valve arrangement (17) which is configured to be actuated by the brake pedal (1) and which in the first fall-back operating mode provides a brake system pressure, proportionable via the brake pedal (1);

providing a driver intention registering device (19);

providing a hydraulic fluid reservoir (10), which is connectable to the actuating unit (2) and to the piston-cylinder arrangements (3*a-d*);

providing an electrical power supply (26, 27);

providing an electronic control unit (13);

providing the first brake boosting function to boost a brake pressure generated by a vehicle driver in the first fall-back operating mode and not in the second fall-back operating mode, the brake system being configured to operate in a default brake-by-wire mode, the brake-by-wire mode including at least a first high-power operating mode operating with the first brake boosting function and a normal operating mode being a low-power operating mode without operating the first brake boosting function; and switching between the first high-power operating mode and the low-power operating mode as a function of a braking situation.

\* \* \* \* \*

UNITED STATES PATENT AND TRADEMARK OFFICE
CERTIFICATE OF CORRECTION

PATENT NO. : 8,702,181 B2  Page 1 of 1
APPLICATION NO. : 13/144571
DATED : April 22, 2014
INVENTOR(S) : Stefan A. Drumm It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 236 days.

Signed and Sealed this

Twenty-ninth Day of September, 2015

Michelle K. Lee
*Director of the United States Patent and Trademark Office*